(12) United States Patent
Madonia

(10) Patent No.: US 11,881,697 B1
(45) Date of Patent: Jan. 23, 2024

(54) MULTIPLE SHEATHED-CABLE SUPPORT CLAMP

(71) Applicant: Scott Madonia, Clinton, NY (US)

(72) Inventor: Scott Madonia, Clinton, NY (US)

(*) Notice: Subject to any disclaimer, the term of this patent is extended or adjusted under 35 U.S.C. 154(b) by 0 days.

(21) Appl. No.: 17/856,064

(22) Filed: Jul. 1, 2022

(51) Int. Cl.
| F16L 3/00 | (2006.01) |
| H02G 3/32 | (2006.01) |
| F16L 3/10 | (2006.01) |
| F16L 3/22 | (2006.01) |
| H02G 3/04 | (2006.01) |

(52) U.S. Cl.
CPC .............. H02G 3/32 (2013.01); F16L 3/1091 (2013.01); F16L 3/222 (2013.01); H02G 3/0406 (2013.01)

(58) Field of Classification Search
None
See application file for complete search history.

(56) References Cited

U.S. PATENT DOCUMENTS

| 4,347,998 | A | * | 9/1982 | Loree ..................... F16L 3/2235 |
| | | | | 174/101 |
| 4,395,009 | A | | 7/1983 | Bormke |
| 4,660,790 | A | | 4/1987 | Muz |
| 5,141,185 | A | | 8/1992 | Rumbold et al. |
| 5,587,555 | A | | 12/1996 | Rinderer |
| 5,743,497 | A | | 4/1998 | Michael |
| 6,241,200 | B1 | | 6/2001 | Camporcale et al. |
| 6,890,191 | B1 | * | 5/2005 | Thorburn ............... H01R 4/646 |
| | | | | 439/607.41 |
| 6,939,165 | B1 | * | 9/2005 | Wu ........................ F16L 3/2235 |
| | | | | 439/492 |
| 7,952,027 | B2 | | 5/2011 | Greick |
| 8,387,927 | B1 | | 3/2013 | Medlin, Jr. |
| 8,523,506 | B2 | | 9/2013 | MacDonald |
| 8,783,629 | B2 | * | 7/2014 | Even ....................... F03D 80/85 |
| | | | | 248/68.1 |
| 10,302,228 | B2 | * | 5/2019 | Costigan .................. H02G 3/30 |
| 2002/0064365 | A1 | * | 5/2002 | Battey .................. H02G 15/007 |
| | | | | 385/136 |
| 2008/0142646 | A1 | | 6/2008 | Magno et al. |
| 2009/0014209 | A1 | | 1/2009 | Forbis |
| 2014/0291455 | A1 | * | 10/2014 | Struck ..................... F16L 57/04 |
| | | | | 248/68.1 |
| 2019/0074674 | A1 | | 3/2019 | Martin |

FOREIGN PATENT DOCUMENTS

GB   2500747 B   2/2013

* cited by examiner

*Primary Examiner* — Steven M Marsh
(74) *Attorney, Agent, or Firm* — Bernhard P. Molldrem, Jr.

(57) ABSTRACT

A multiple cable clamp is configured to hold a number of sheathed electrical cables in a cable run within a building structure using electrical power, with such cables in a parallel flat array. The cable clamp is configured as a pair of rail members, one being a back or distal rail member and the other being a corresponding front or proximal rail member. These rail members can favorably be formed as bars of a tough, sturdy non-conductive material such as PVC or similar plastic resin. Transverse grooves and lands in the distal member align with teeth and recesses in the proximal member to contain and secure the respective sheathed cables. The depth of the teeth can vary to accommodate different size cables.

12 Claims, 3 Drawing Sheets

MULTIPLE SHEATHED-CABLE SUPPORT CLAMP

BACKGROUND OF THE INVENTION

This invention relates to the securing and organizing of electrical power cables in a structure, which may be a house, factory or office building, or may be a floating structure. Typically, power lines entering a building terminate at a power distribution box or breaker box, and from that point power is supplied to individual electrical circuits on respective electric cables. At present, sheathed cable, informally called Romex, is typically used for the cable runs that extend from the breaker box to circuit in areas in the building, so that the power supplied by those cables can operate lights or machinery in the various parts of the building structure.

In order to facilitate initial installation of electrical power circuits during building construction, or afterwards, and to facilitate repair or additional installation, if is important to keep the cable runs organized so that the various power cables for the various electrical applications can be readily identified later.

Cable organizers or cable clamps can be affixed to studs and/or joists of the building prior to the installation of walls, with spaced cable holders for the sheathed cables, so that the cables can be easily identified and accessed later. These cable holders keep the cables stacked in a more-or-less organized state. Cable stackers tend to be made of a somewhat flexible plastic and are nailed to a vertical member, stud, or other structural member. Often holes are bored through joists or studs to run the cables through.

What no prior sheathed cable holder or clamp has been able to achieve is to guide a number of these cables in a parallel array, either vertically (from floor to ceiling) or horizontally.

A number of solutions have been proposed or utilized for stringing sheathed (i.e., Romex) electrical cable in buildings or other structures. These include staples to hold down each cable, and various multi-cable clamps with recesses on the holder for the respective cables. None of these is satisfactory in aligning the several (or many) cables in a given cable run, nor do these help identify what part of the breaker panel the cable runs from, or what appliances or outlets it connects to. None of the prior cable clamping devices has been satisfactory for running multiple cables vertically in a wall and keeping the cables centered on a stud or between studs.

Another approach has been bundling cables to pass through a circular hole drilled in a support member such as a stud or a joist. The bundling affects heat dissipation, and as a result the amperage limit of the cables has to be de-rated.

It is an objective of this invention to provide a simple, straightforward cable clamp that can be installed easily, and can arrange the cables evenly in a row of multiple cables.

It is another object for the cable clamp to facilitate labeling and/or numbering the sheathed cables, e.g., so the cables in the cable run can be numbered on the cable clamp and matched with the numbers on the respective circuit breakers.

A further objective is for the cable clamp to be made of a material that can be cut if need be so as to carry a smaller number of cables.

It is another object that the cable clamp accommodate sheathed cables of different thicknesses.

In accordance with an aspect of this invention, a multiple cable clamp is configured to hold a number of sheathed electrical cables in a cable run within a building structure, such as a dwelling, commercial building, agricultural building, or other structure using electrical power. Favorably, the multiple cable clamp can hold these cables in a parallel flat array. The cable clamp can be configured as a pair of rail members, one being a back or distal rail member and the other being a corresponding front or proximal rail member. These rail members can favorably be formed as bars of a tough, sturdy non-conductive material such as PVC or similar plastic resin.

In one disclosed embodiment, the distal and proximal rail members mate with one another to capture the sheathed cables directly between them.

In a practical example, the distal rail member has transverse cuts or recesses at intervals so as to constitute transverse lands and grooves on its proximal facing side. The grooves are dimensioned to seat the cables. The proximal rail member similarly has alternate transverse recesses and teeth at its distal side. The recesses and teeth are patterned so that the recesses in the proximal rail member align with the lands in the distal rail member, and the teeth in the proximal rail member align with the grooves in the distal rail member.

The distal rail member can be fastened, e.g., with screws, to the wall or other structural member of the building, and the proximal rail member can be latched or clamped, or screwed onto the distal rail member to capture the sheathed electrical cables between the proximal and distal rail members.

The proximal rail member may have at least eight teeth and the corresponding distal rail member may have at least a corresponding eight grooves, so as to accommodate at least eight sheathed cables. The distal rail member may be formed with a plurality of proximal-distal bores therein each of sufficient bore size to accommodate a screw fastener, to attach it to a building structural member. A latching or other clamping mechanism may serve as a clamp device for holding the proximal rail member against said distal rail member when one or more cables are supported between them. Alternatively, a pair of screw members are provided for securing the proximal rail member onto the distal rail member.

In a favorable embodiment, the rail members are formed of a PVC material but may be composed of another tough rigid or semi-rigid synthetic resin material.

In order to accommodate different size sheathed cables, some of the teeth of the proximal rail member are of one predetermined depth, and others of the teeth are of a different depth, so as to accommodate two different thicknesses of sheathed cable. In that case, or where the teeth are all the same depth, the teeth may include pads of a resilient material on their distal surfaces.

The foregoing and other features and advantages of the cable clamp of this invention may be better understood from a consideration of a preferred embodiment thereof, as descripted in connection with the accompanying Drawing figures.

DETAILED DESCRIPTION OF THE PREFERRED EMBODIMENT

Figure 1:
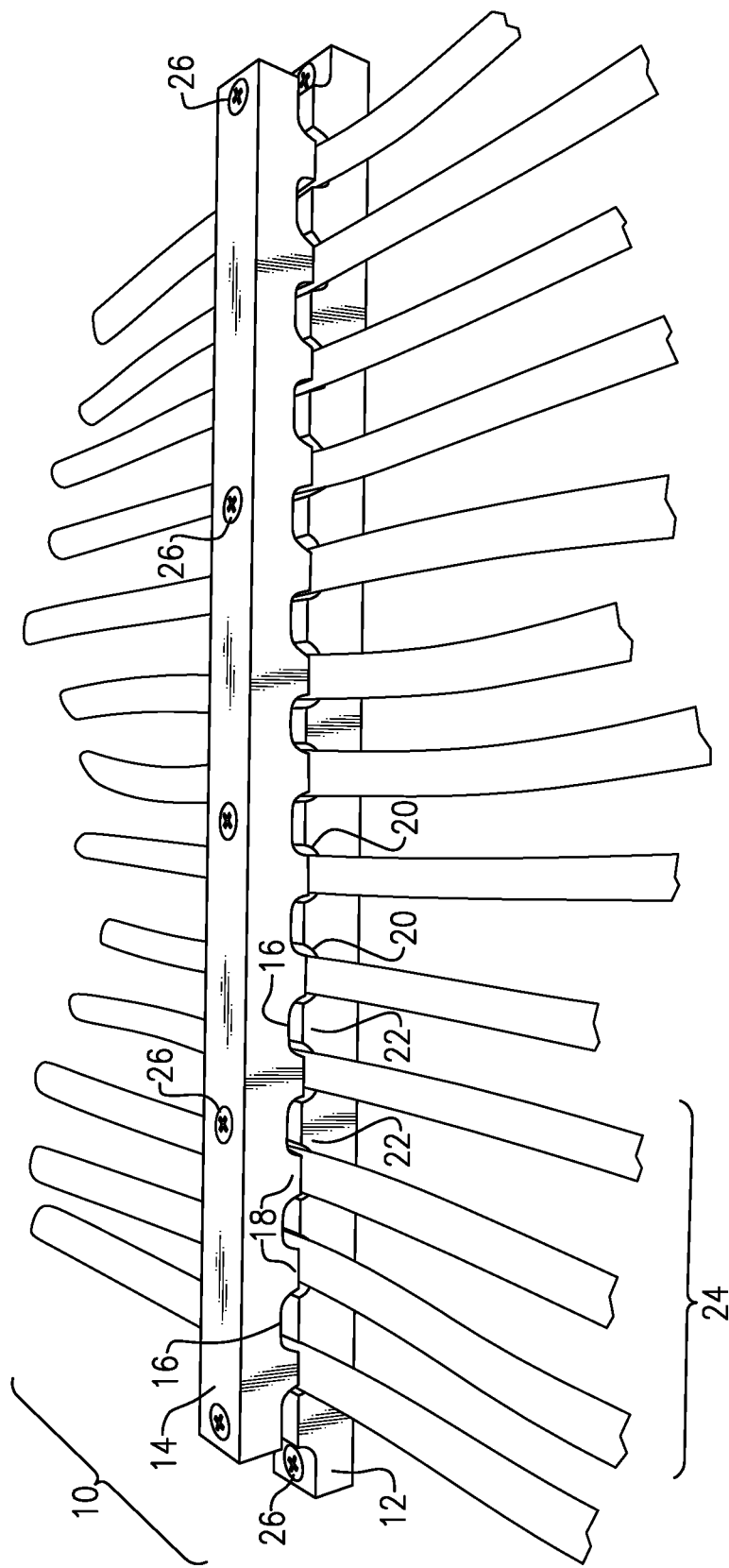
FIG. 1 is a perspective view, from below, of one preferred embodiment of the cable clamp of this invention, shown holding a number of sheathed electrical cables in a flat array.
Figure 2:
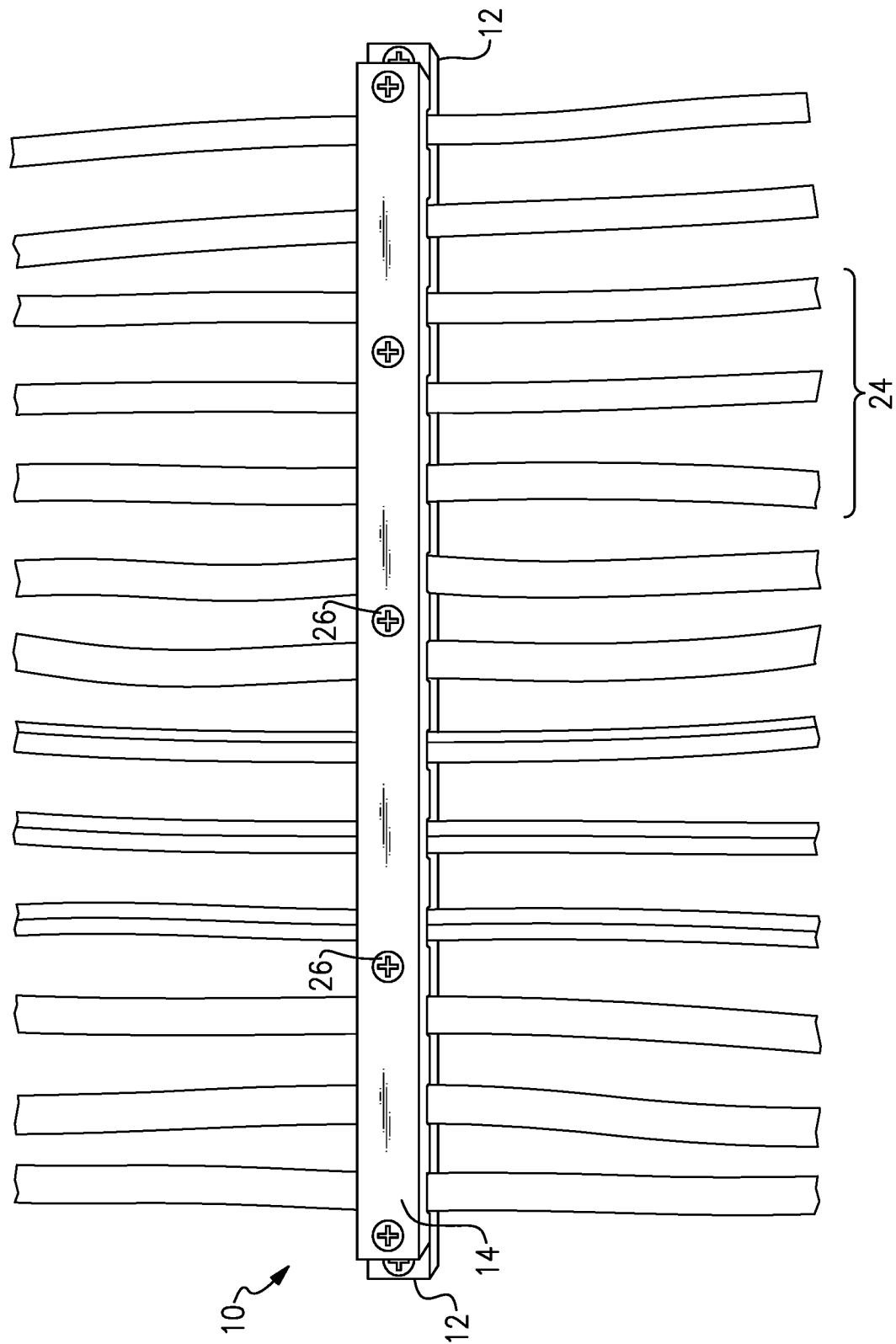
FIG. 2 is a front perspective thereof.

With reference now to the Drawing, and initially to FIGS. 1 and 2, an embodiment of the cable clamp 10 of my invention comprises a pair of elongated rails 12 and 14. A lower or distal rail member 12 is affixed to a wall or other structure with the upper or proximal rail member 14 of the two rails being aligned with the distal rail 12, and clamped or fastened to it. As seen here, the upper or proximal rail 14 is formed with recesses 16 cut out of it a regular intervals, thereby creating teeth 18 between successive recesses 16. On the lower or distal rail 12 there is a succession of grooves 20 cut out from forward side of the distal rail 12, leaving corresponding successive lands 22. In this embodiment the teeth 18 of the upper or proximal rail member align with the grooves 20 of the lower or distal rail member 12. Likewise, the lands 22 of the distal rail member align with the recesses 16 in the proximal rail member 14. The two rail members should combine to make a snug, but not crushing fit on the respective sheathed cables 24.

The lower or distal rail member 12 is attached to the wall or other structural member with screw fasteners 26, and the upper or proximal rail member 14 is screwed onto the distal rail member, with the screws 26 going through bores that are aligned with the recesses and lands, so that the screws 26 are not located at the position of one of the cables 24.

Figure 3:
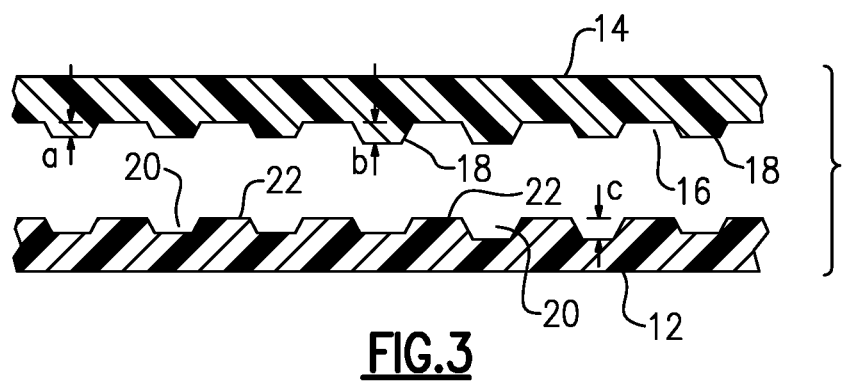
FIG. 3 is a sectional view showing the upper rail having teeth of different depths to accommodate sheathed cables of different thicknesses.
Figure 4:
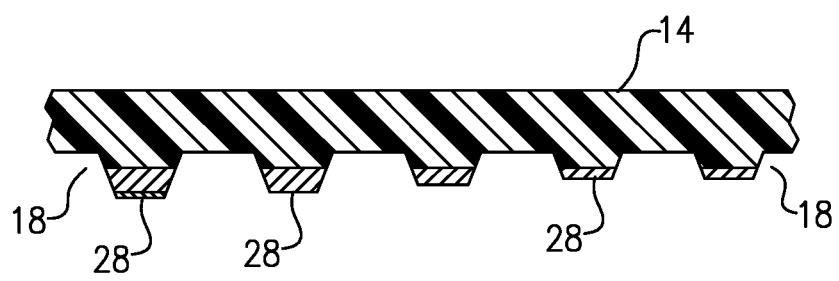
FIG. 4 is a sectional view of the upper or proximal rail, in which the teeth have an elastomeric cap or pad on their distal surfaces, and which may be of different predetermined thicknesses.

Referring now to FIG. 3, the upper and lower rails can be configured so there is more space provided for larger sheathed cables, and less for smaller cables. That us some of the teeth 18 in the upper rail 14 can be dimensioned shorter than certain other ones of the teeth 18, so that some teeth have a depth a while others have a greater depth b so that the larger cables can be place where the corresponding teeth have a shorter depth a, and smaller diameter cables can be placed where the tooth has a shorter depth a. On the other hand, while the lower rail 12 may be formed with cutouts or grooves 20 at one given depth, it is possible to provide others with a greater depth c as shown. Likewise, as shown in FIG. 4, the teeth of the upper or proximal rail member may be provided with resilient pads 28 rather than cutting the recesses and teeth at different depths.

Another advantage of the cable clamps of my invention is that the bars or rails can be cut to a smaller length when needed for a smaller array of cables, so that it is not necessary to keep a large assortment of these cable support clamps on hand for an electrical installation.

The invention has been described herein with reference to a single preferred embodiment with some variations, but the invention is not limited to that embodiment. Rather, many modifications and variations will become apparent to persons skilled in the art without departing from the scope and spirit of this invention, as defined in the appended claims.

What is claimed is:

1. A multiple-sheathed-cable support clamp for organizing and securing a plurality of sheathed electrical cables in a building structure; each cable of said plurality of electric cables having a flexible non-metallic sheath and a plurality of conductive wires within the respective sheath, comprising:

mating distal and proximal rail members, each said rail member being formed as a bar of a durable; tough, sturdy non-conductive tough, rigid or semi-rigid synthetic plastic resin, said distal rail member being a one-piece bar having alternate transverse lands and grooves formed therethrough at a forward side thereof, and having a rear side that is substantially flat, said proximal rail member being formed as a one-piece bar having alternative transverse recesses and teeth unitarily formed thereon on a distal facing side thereof, and said recesses and said teeth being patterned so that the recesses in said proximal rail member align with the transverse lands of said distal rail member, and with the teeth of the proximal rail member aligned with the grooves in said distal rail member such that when said lands mate with corresponding recesses, said teeth are spaced a predetermined distance from corresponding grooves in said proximal rail member so as to accommodate a predetermined thickness of a sheathed cable secured against a respective groove between the proximal and distal rail members with said grooves directly supporting said sheaths of said electric cables and said teeth pressing against the sheaths of said electric cables.

2. The multiple-sheathed-cable support clamp of claim 1 wherein said proximal rail member has at least eight teeth and a corresponding distal rail member has at least a corresponding eight grooves, so as to accommodate at least eight sheathed cables.

3. The multiple-sheathed-cable support clamp of claim 1 wherein said distal rail member has a plurality of proximal-distal bores therein each of sufficient bore size to accommodate a screw fastener, and further comprising a plurality of said screw fasteners.

4. The multiple-sheathed-cable support clamp of claim 1 comprising a clamp device for holding the proximal rail member against said distal rail member when one or more romex cables are supported between them.

5. The multiple-sheathed-cable support clamp of claim 1 wherein a pair of screw members are provided for securing the proximal rail member against the distal rail member.

6. The multiple-sheathed-cable support clamp of claim 1 wherein the tough rigid or semi-rigid synthetic plastic resin material of said proximal and distal rail members is configured to be cut if needed so as to carry a smaller number of cables.

7. The multiple-sheathed-cable support clamp of claim 1 wherein predetermined ones of said teeth of said proximal rail member are of a first predetermined depth, and the remaining others of said teeth are of a second predetermined depth, so as to accommodate two different thicknesses of said sheathed cable retained by respective ones of said teeth.

8. The multiple-sheathed-cable support clamp of claim 7, wherein said teeth include pads of a resilient material of a predetermined thickness affixed onto distal surfaces thereof.

9. The multiple-sheathed-cable support clamp of claim 1, wherein said tough, sturdy non-conductive plastic resin is PVC.

10. The multiple-sheathed-cable support clamp of claim 1, wherein a plurality of the recesses in said proximal rail member each have a receptacle for receiving a screw fastener, and a corresponding plurality of the lands in said distal rail member have respective receptacles for such screw fasteners such that the screw fasteners will hold the proximal rail member onto the distal rail member with the sheathed cables held therebetween.

11. A multiple-sheathed-cable support clamp for organizing and securing a plurality of sheathed electrical cables in a building structure; each cable of said plurality of electric cables having a flexible non-metallic sheath and a plurality of conductive wires within the respective sheath, said support clamp consisting essentially of mating pairs of distal and proximal rail members, each of said rail members being formed as a one-piece bar of a durable; tough, sturdy non-conductive plastic resin, and a plurality of fastener members for securing the proximal real member onto the distal rail member, each said distal rail member being unitarily formed and having alternate transverse lands and grooves formed therethrough at a forward side thereof, and having a rear side that is substantially flat, each said proximal rail member having alternative transverse recesses and teeth unitarily formed thereon on a distal facing side thereof, and said recesses and said teeth being patterned so that the recesses in said proximal rail member align with the transverse lands of said distal rail member, and with the teeth of the proximal rail member aligned with the grooves in said distal rail member such that when said lands mate with corresponding recesses, said teeth are spaced a predetermined distance from corresponding grooves in said proximal rail member so as to accommodate a predetermined thickness of a sheathed cable secured against a respective groove between the proximal and distal rail members with respective said grooves directly supporting said sheaths of said electric cables and each of said teeth pressing against the sheath of a respective one of said electric cables.

12. The multiple-sheathed-cable support clamp of claim 11, wherein said fastener members are screw fasteners, a plurality of the recesses in at least one said proximal rail member have a receptacle for receiving a screw fastener, and a corresponding plurality of the lands in a respective said distal rail member have respective receptacles for such screw fasteners such that the screw fasteners will hold the proximal rail member onto the distal rail member with the sheathed cables held therebetween.

\* \* \* \* \*